Patented Oct. 7, 1924.

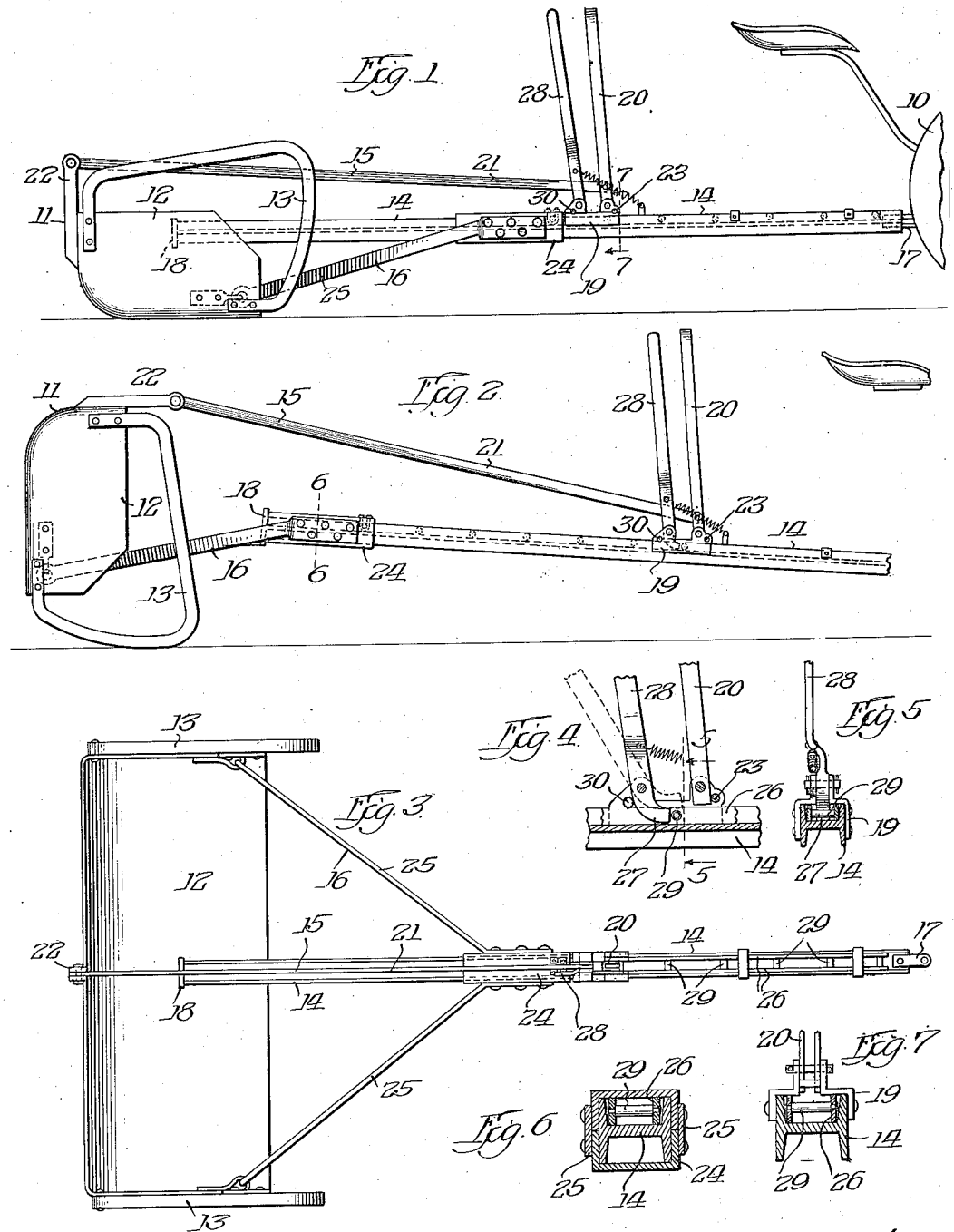

1,510,824

UNITED STATES PATENT OFFICE.

LEN O. BIRD, OF SALT LAKE CITY, UTAH

DRAFT RIGGING.

Application filed March 19, 1923. Serial No. 625,932.

*To all whom it may concern:*

Be it known that I, LEN O. BIRD, a citizen of the United States, residing at Salt Lake City, in the county of Salt Lake and State of Utah, have invented certain new and useful Improvements in Draft Riggings, of which the following is a specification.

The present invention is concerned with the draft-riggings of tractor hitched scrapers, and has for its principal object the provision of a novel draft-rigging wherein the scraper-manipulating controls are permanently located within convenient reach of the tractor operator. Although the draft-rigging of the invention is particularly adapted for use with a scraper, it will be appreciated that the same may also be incorporated in other material-handling implements of a like general character without sacrificing any of the substantial advantages of the invention.

While the foregoing statement is indicative, in a general way, of the nature of the invention, other objects and advantages not specifically referred to in this disclosure will be obvious upon a full understanding of the invention.

One embodiment of the invention is set forth in the following description and in the accompanying drawings, but it is to be understood that this particular embodiment is chosen merely for the purpose of exemplification and is not intended to restrict in any way the application of the invention or to limit unnecessarily the scope of the appended claims.

In the drawings,

Fig. 1 is a side elevation of a scraper embodying the draft-rigging of the invention, the scraper being shown in its operative or loading position;

Fig. 2 is a similar view, the scraper being shown in its inoperative or unloading position;

Fig. 3 is a plan view of the scraper;

Fig. 4 is a fragmentary sectional view of a portion of the scraper-manipulating controls;

Fig. 5 is a section on the line 5—5 of Fig. 4;

Fig. 6 is a section on the line 6—6 of Fig. 2; and

Fig. 7 is a section on the line 7—7 of Fig. 1.

It will be observed, upon a more detailed inspection of the drawings, that the present draft-rigging is adapted to effect a variable coupling between a suitable source of traction 10 and a material-handling implement 11. In this disclosure the source of traction and the material-handling implement are respectively represented to be the usual engine tractor and a scraper of the well known Fresno type having a scoop portion 12 which is adapted to tilt forwardly and upwardly on two laterally spaced runners 13 into an elevated discharging position. Fig. 1 illustrates the scraper in its operative or loading position, and Fig. 2 illustrates the same in its inoperative or discharging position.

The draft-rigging comprises in general an elongated draft frame 14 and two associated connecting devices 15 and 16 for attachment with the scraper; the device 15 being adapted to effect a variable connection between the frame and the upper portion of the scraper, and the device 16 being adapted to effect both a variable and a releasable connection between the frame and the lower portion of the scraper.

The frame 14, which is preferably an H shaped beam, is provided at its front end with a hitching clevis 17, at its rear end with a stop 18, and intermediate its ends at a point adjacent the tractor seat with a mounting bracket 19 for the scraper controls.

The connecting device 15 consists of a control lever 20 and a rod 21. The lever 20 is pivotally attached at its lower end to the mounting bracket 19, and provides at its upper end a handle which is within convenient reach of the operator from the seat of the tractor. The rod 21 is pivotally attached at its front end to the lever 20 and at its rear end to an arm 22 which extends upwardly from the rear of the scraper; the arm 22 being advantageously secured to the scoop by the means ordinarily provided in such scrapers for the attachment of the herein eliminated Johnson bar. It will be appreciated that this construction provides a variable connection between the frame 14 and the upper portion of the scraper, and that the connection may be shortened to the extent desired and under a substantial leverage by a forward movement of the handle of the control lever 20. When the control lever 20 is in the position illustrated in Fig.

1 the scoop is in a horizontal conveying position, but when the handle of the control lever is moved forwardly the scoop assumes a position of angular engagement with the surface over which it is moving, whereupon the scoop is loaded—the depth of the scraping action and the rapidity of loading being, of course, dependent upon the adjustment given the connecting device 15 through manipulation of the control lever 20. A suitable stop 23, such as a bolt which extends across the mounting bracket 19, is provided to prevent any rearward movement of the control lever 20 beyond the position of the same corresponding to the horizontal conveying position of the scoop.

The connecting device 16 consists of a sleeve 24 which is slidably mounted on the frame 14 between the stop 18 and the mounting bracket 19, two spaced rods 25 which are rigidly secured to the sleeve 24 and diverge rearwardly and downwardly therefrom to points where they pivotally connect with the lower sides of the scoop, and means for effecting both a variable and releasable connection between the sleeve 24 and the frame 14—said means consisting of a rack structure 26 and a coacting latch 27 operated by a control lever 28 which is pivotally attached at its lower end to the mounting bracket 19. The rack structure 26 is secured to and extends forwardly from the sleeve 24 in the upper channel of the frame 14, and is characterized by a plurality of spaced cross members 29 which are adapted for selective engagement with the latch 27 upon movement of the rack structure longitudinally of the frame 14. The latch 27 is a trigger which is formed as an integral downwardly and forwardly curved portion of the control lever 28, and is adapted, while permitting forward movement of the rack structure 26, to prevent rearward movement of the same by interlocking with one of the cross members 29. A suitable stop 30, similar to stop 23, is provided to prevent any forward movement of the control lever 28 after the latch has interlocked with one of the cross members, and a spring 31 may be provided for the purpose of normally holding the latch in its interlocked position.

When the control lever 28 is in the position illustrated in Fig. 1 with its trigger interlocked with the cross-member 29 that is nearest to the sleeve—the scoop is either in its loading or its conveying position, depending upon the adjustment being effected with the control lever 20; but, when the control handle 28 is moved rearwardly and the latch is thereby caused to disengage from the rack structure 26, the sleeve 24 with its associated rack structure and draft rods leading to the lower portion of the scoop ceases its advance with the frame 14. As the sleeve assumes a position against the stop 18 at the rear end of the frame 14, the scoop is tilted forwardly and upwardly into an elevated discharging position on its spaced runners 13, as illustrated in Fig. 2. Upon the scoop assuming such a position, the contents of the scoop are abruptly dumped in one pile. In order to spread the contents over a more extended area the control lever, upon being unlatched from the rack structure, is immediately relatched with one of the other cross members 29 of the structure. This prevents the scoop from assuming such an extreme vertical position, whereby a less abrupt dumping is effected, and the front edge of the scoop, being less elevated, serves to spread the contents over a more extended area. From the foregoing explanation it will, of course, be understood that the character of the discharge is governed by the distance which the frame is permitted to advance before the released sleeve 24 is re-engaged therewith.

I claim:

1. In combination with a material-handling implement, a draft-rigging comprising a draft frame adapted to be attached to a source of traction, two connections extending from the frame to spaced portions of the implement, means for varying one of the connections, and means for both varying and releasing the other connection.

2. In combination with a material-handling implement, a draft-rigging comprising an elongated draft frame adapted to be attached adjacent its front end to a source of traction, two connections extending from the frame to the upper and lower portions respectively of the implement, means for varying the upper connection, and means for both varying and releasing the lower connection.

3. In combination with a material-handling implement, a draft-rigging comprising an elongated draft frame adapted to be attached adjacent its front end to a source of traction, a connection extending from the frame to the upper portion of the implement and consisting of a control lever which is pivotally mounted on the frame and a rod which is pivotally secured at its front end to the lever at a point spaced from the pivotal mounting of the same and at its rear end to the implement, a connection extending from the frame to the lower portion of the implement, and means for both varying and releasing the last mentioned connection.

4. In combination with a material-handling implement, a draft-rigging comprising an elongated draft frame adapted to be attached adjacent its front end to a source of traction, and a connection extending from the frame to the lower portion of the implement and consisting of a sleeve which is slidably mounted on the frame, means connecting the sleeve with the implement, a forward extension to the sleeve provided with a plurality of longitudinally spaced abutment portions, a latch for selective engagement with any one of said abutment portions, and a control lever pivotally mounted on the frame for operating the latch.

5. In combination with a material-handling implement, a draft-rigging comprising an elongated draft frame adapted to be attached adjacent its front end to a source of traction, a connection extending from the frame to the upper portion of the implement, means for varying the connection, and a connection extending from the frame to the lower portion of the implement and consisting of a sleeve which is slidably mounted on the frame, means connecting the sleeve with the implement, a forward extension to the sleeve provided with a plurality of longitudinally spaced abutment portions, a latch for selective engagement with any one of said abutment portions, and a control lever pivotally mounted on the frame for operating the latch.

6. In combination with a material handling implement, a draft-rigging comprising an elongated draft-bar of channel formation, an elongated rack member slidable in said channel and provided with a plurality of abutments extending transversely of said channel, a box encircling said draft-bar and slidable thereon, said box having connection with said rack member, divergent arms connecting said box with said implement, a lever mounted upon said draft-bar and provided with a lower extension adapted for engagement with any one of said abutments whereby travel of the said box on said draft-bar may be varied, a second lever mounted upon said draft-bar, and a link connecting said last named lever with an extension carried by said implement, whereby said implement may be tilted forward.

In testimony whereof I have hereunto subscribed my name.

LEN O. BIRD.